Jan. 17, 1956      E. C. SHAW      2,731,183
MAKING OIL FILTER CARTRIDGES
Filed March 14, 1952      10 Sheets-Sheet 1
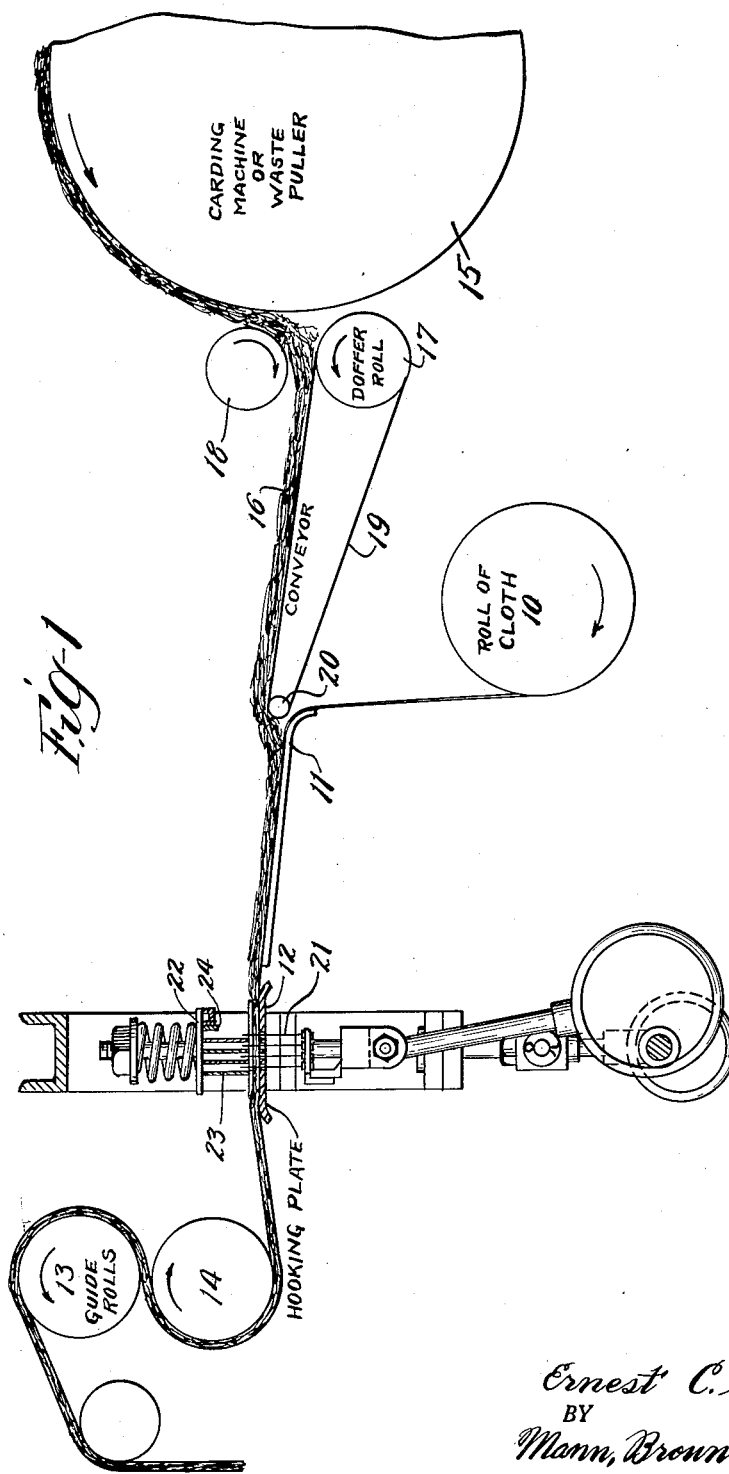
INVENTOR.
Ernest C. Shaw
BY
Mann, Brown & Hansmann
Attys.

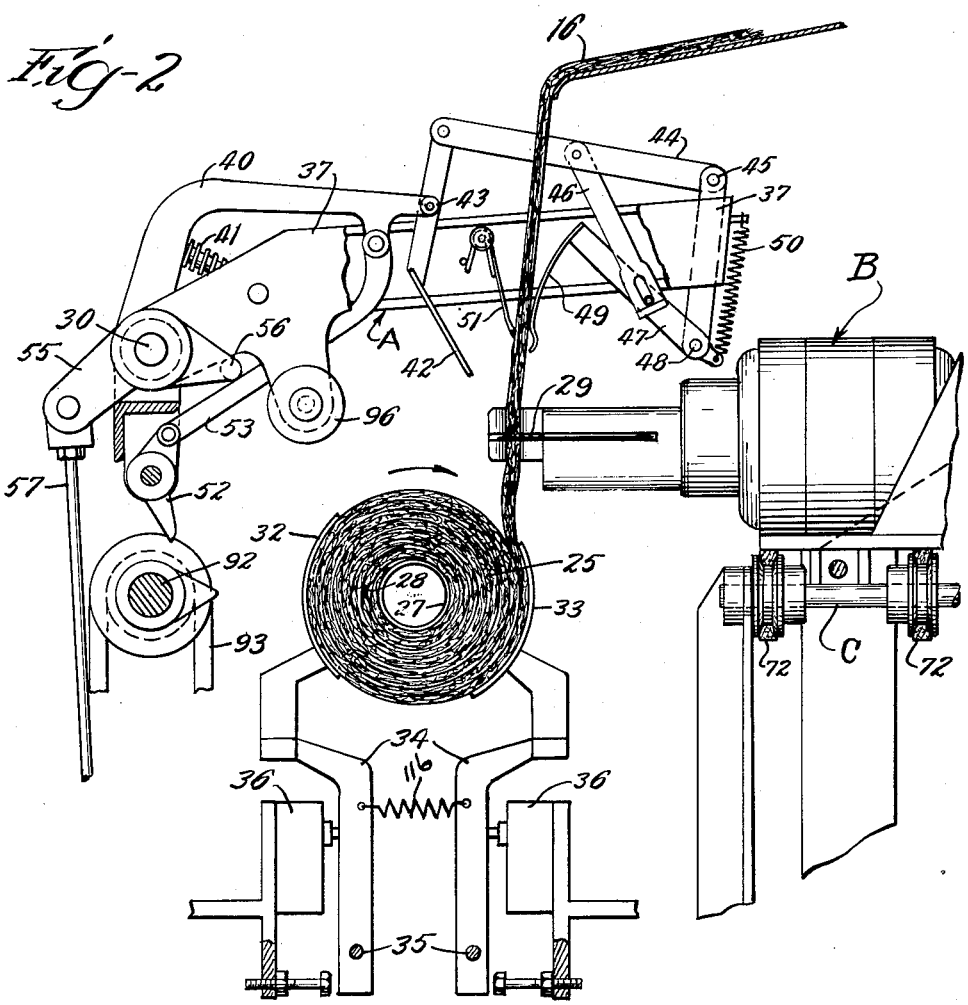

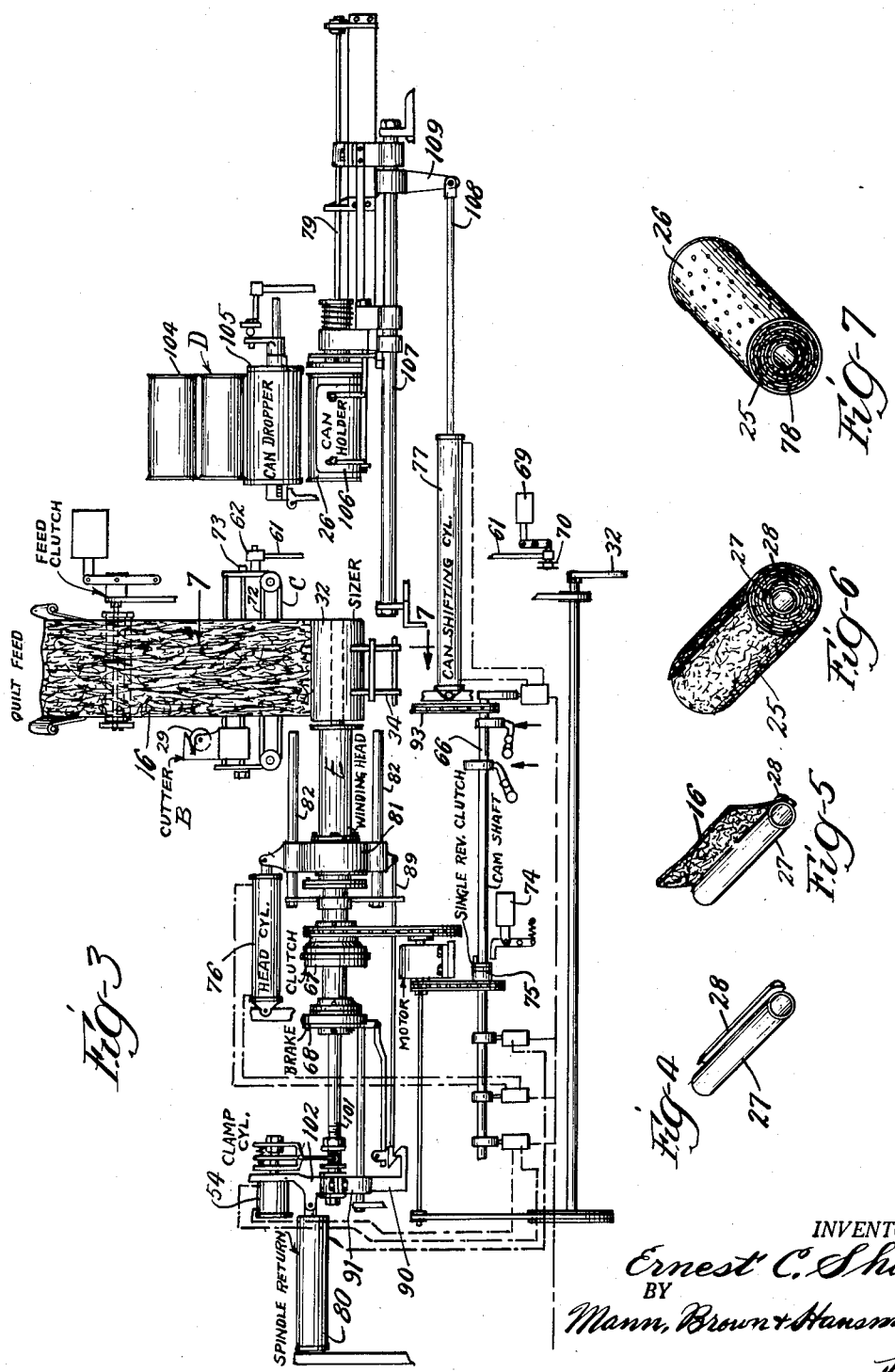

Jan. 17, 1956  E. C. SHAW  2,731,183
MAKING OIL FILTER CARTRIDGES
Filed March 14, 1952  10 Sheets-Sheet 4
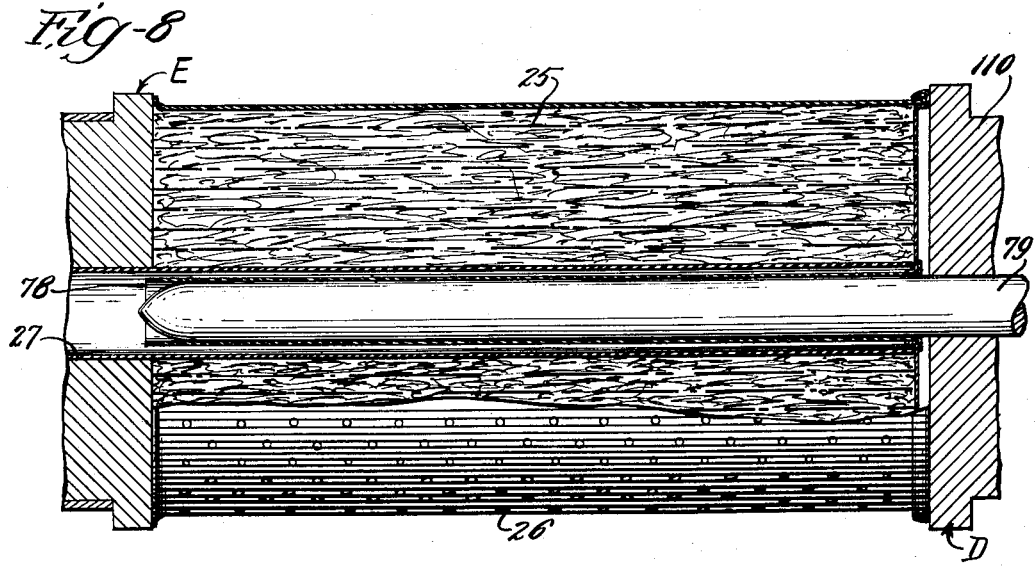
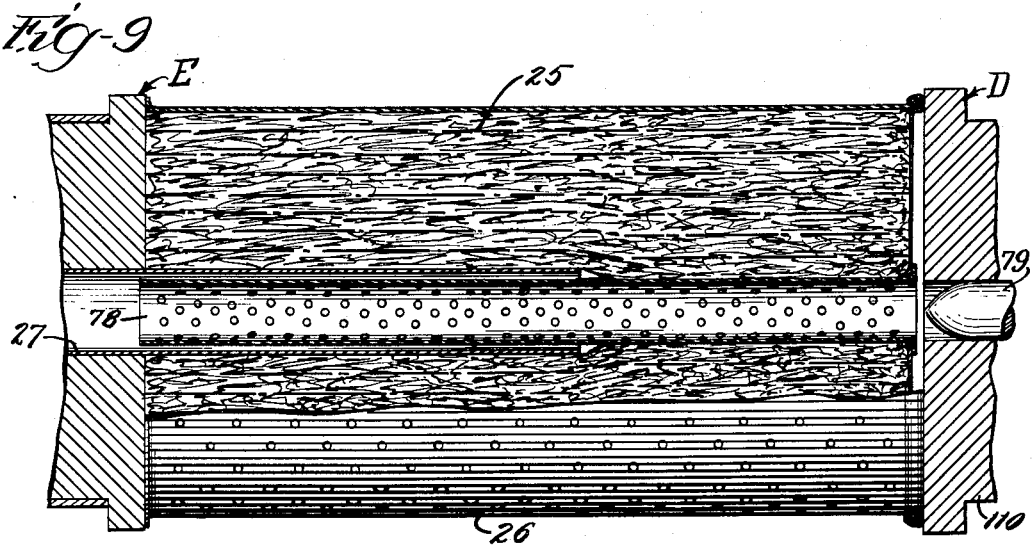
INVENTOR.
Ernest C. Shaw
BY
Mann, Brown & Hansmann
Attys.

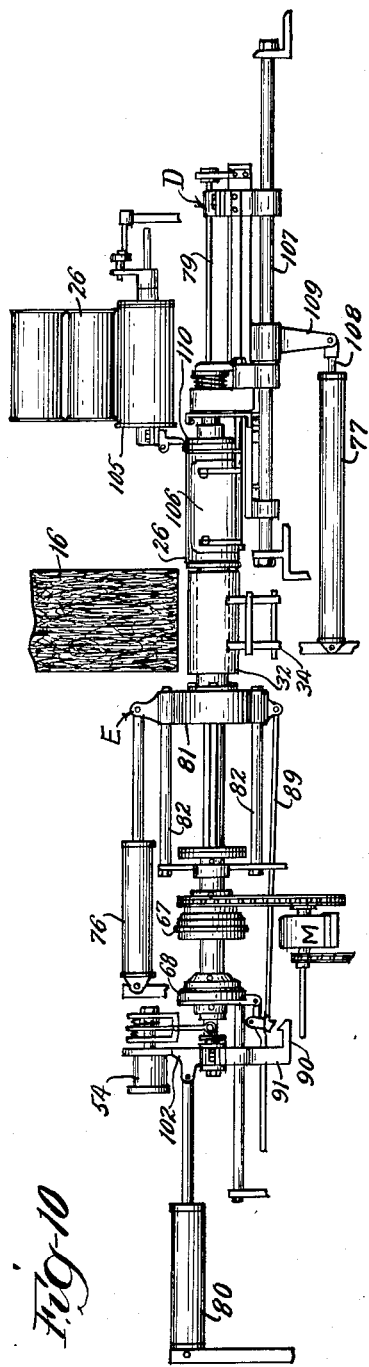
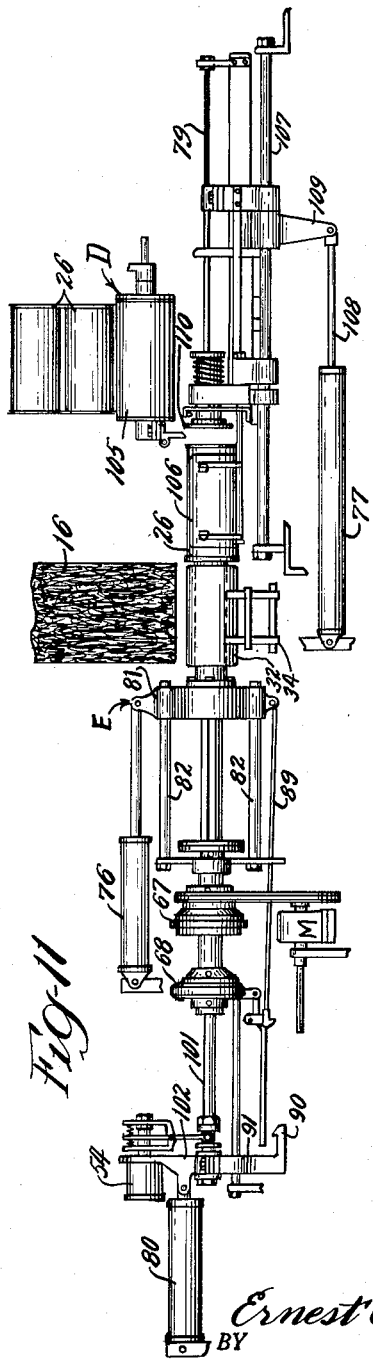

Jan. 17, 1956        E. C. SHAW        2,731,183
MAKING OIL FILTER CARTRIDGES
Filed March 14, 1952        10 Sheets-Sheet 6
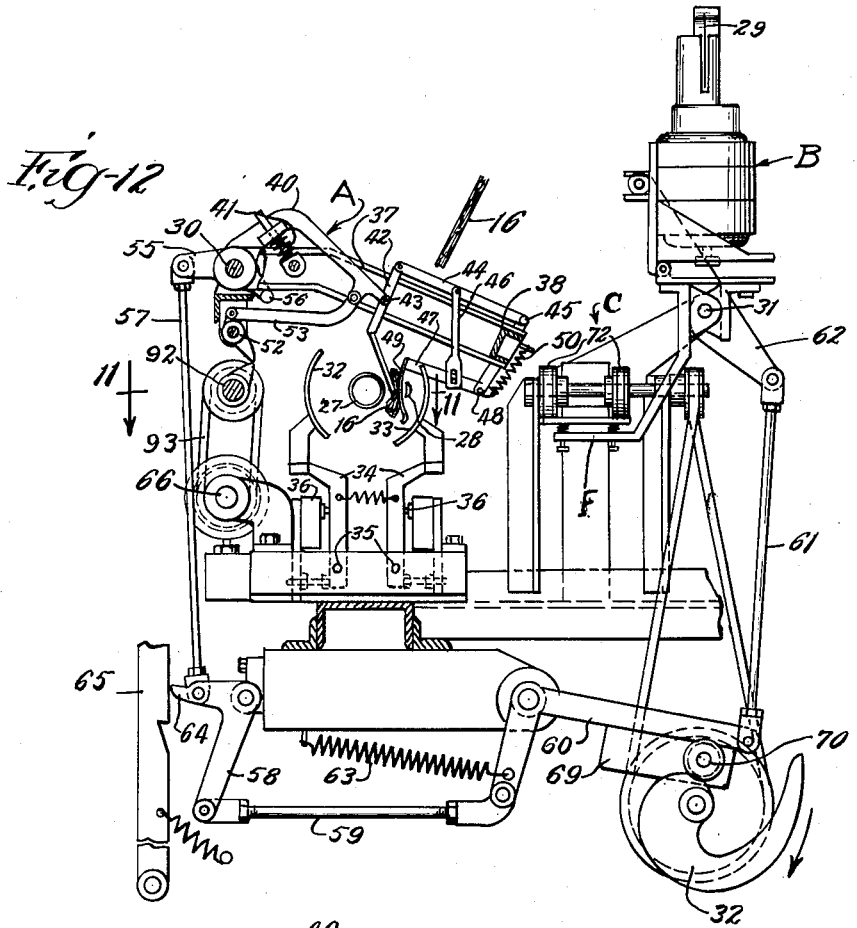
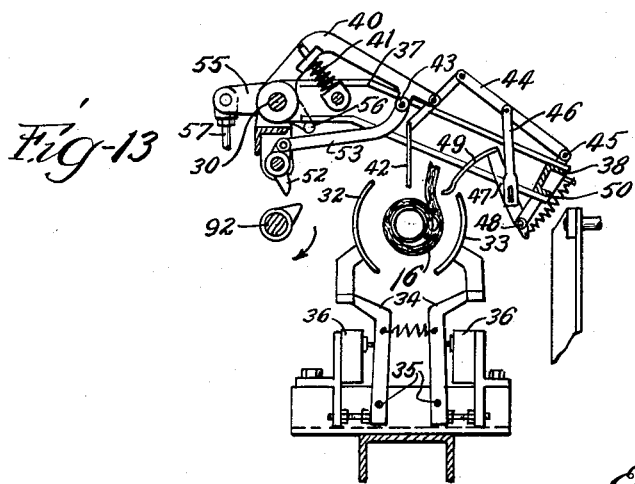
INVENTOR.
Ernest C. Shaw
BY
Mann, Brown & Hansmann
Attys.

Jan. 17, 1956 E. C. SHAW 2,731,183
MAKING OIL FILTER CARTRIDGES
Filed March 14, 1952 10 Sheets-Sheet 7
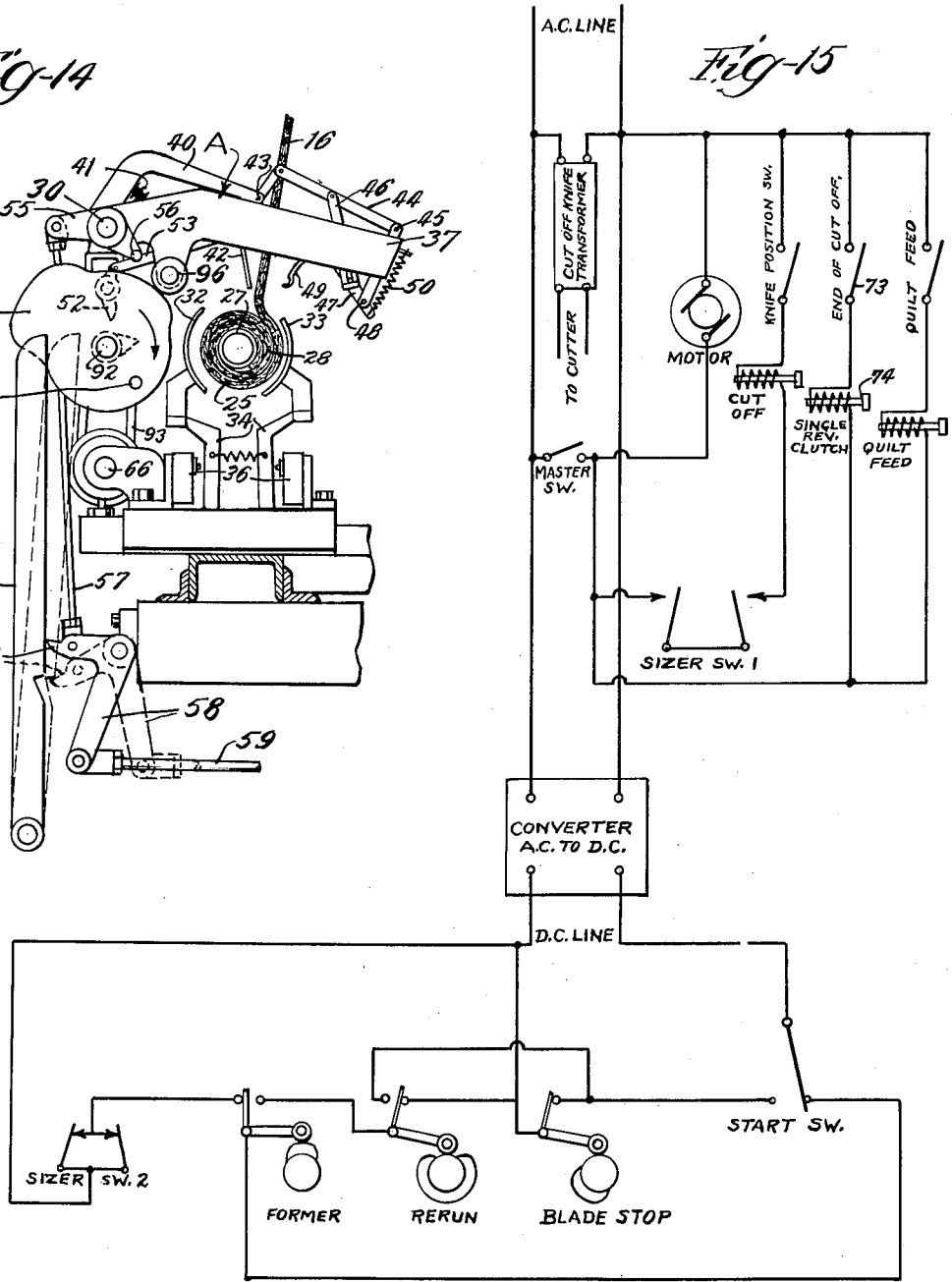
INVENTOR.
Ernest C. Shaw
BY
Mann, Brown & Hansmann
Atty's.

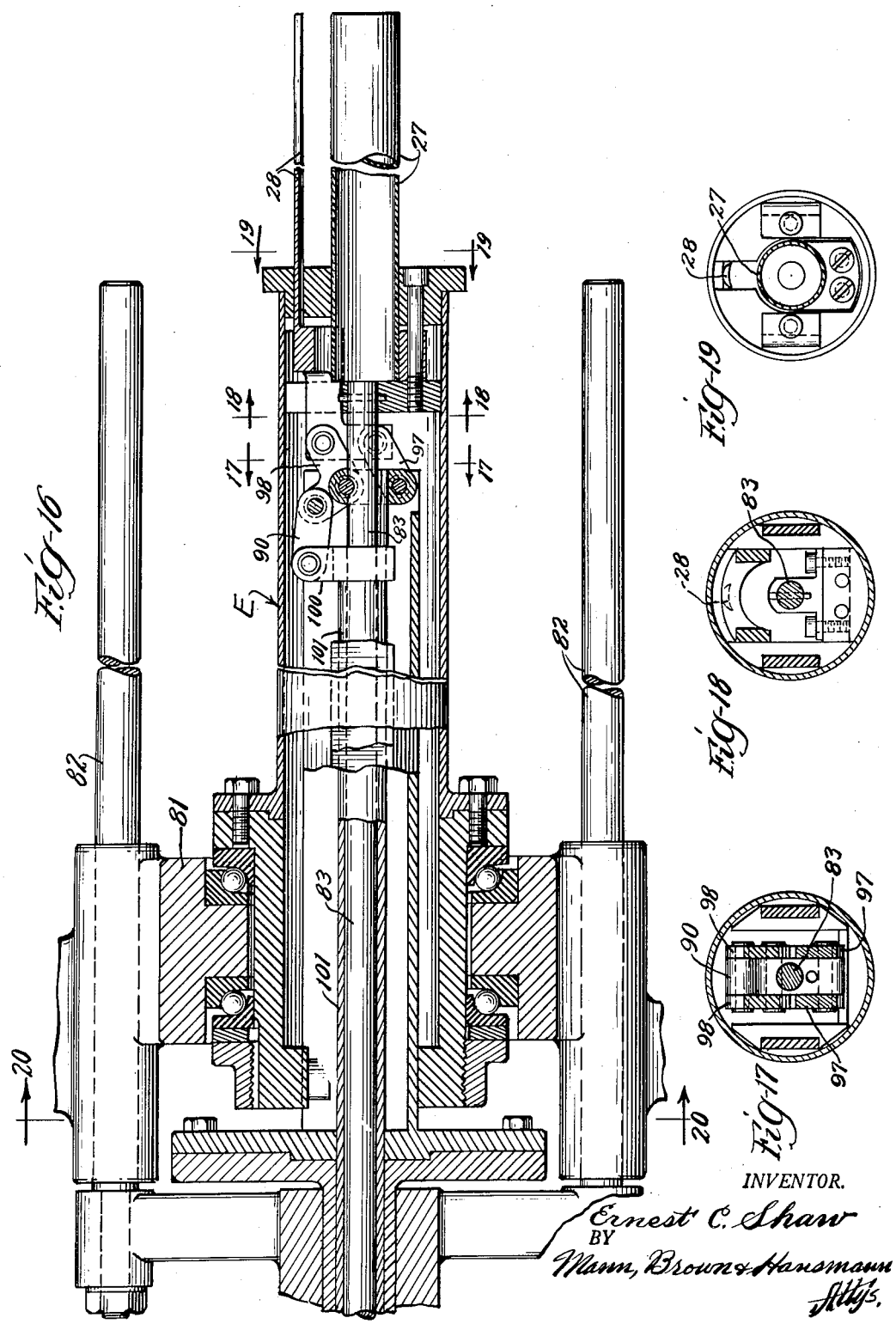

Jan. 17, 1956  E. C. SHAW  2,731,183
MAKING OIL FILTER CARTRIDGES
Filed March 14, 1952  10 Sheets-Sheet 9
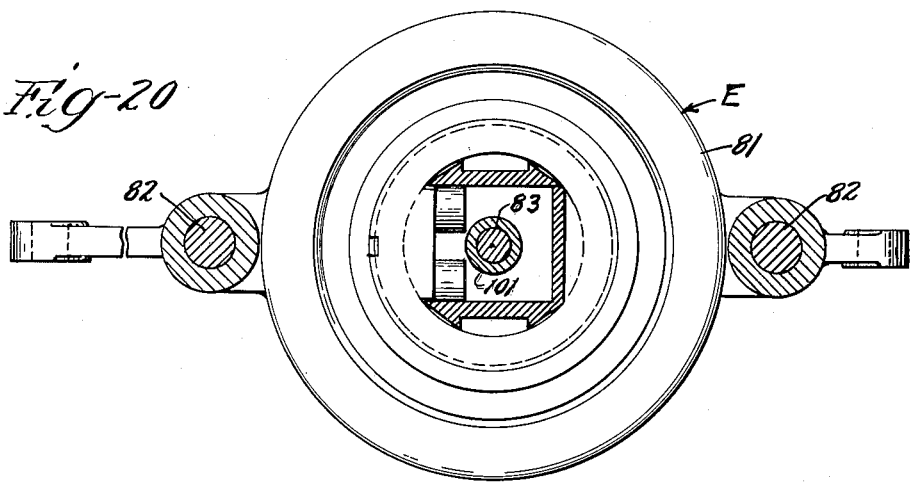
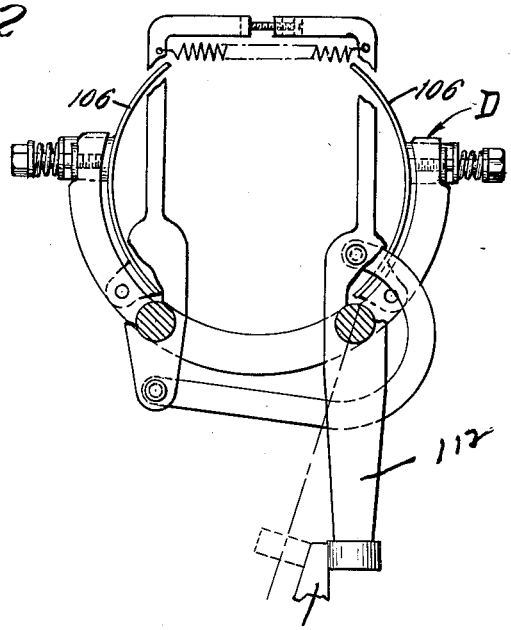
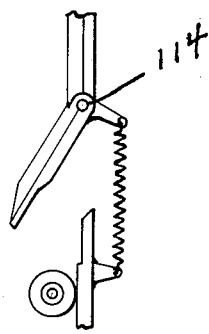
INVENTOR.
Ernest C. Shaw
BY
Mann, Brown & Hansmann
Attys

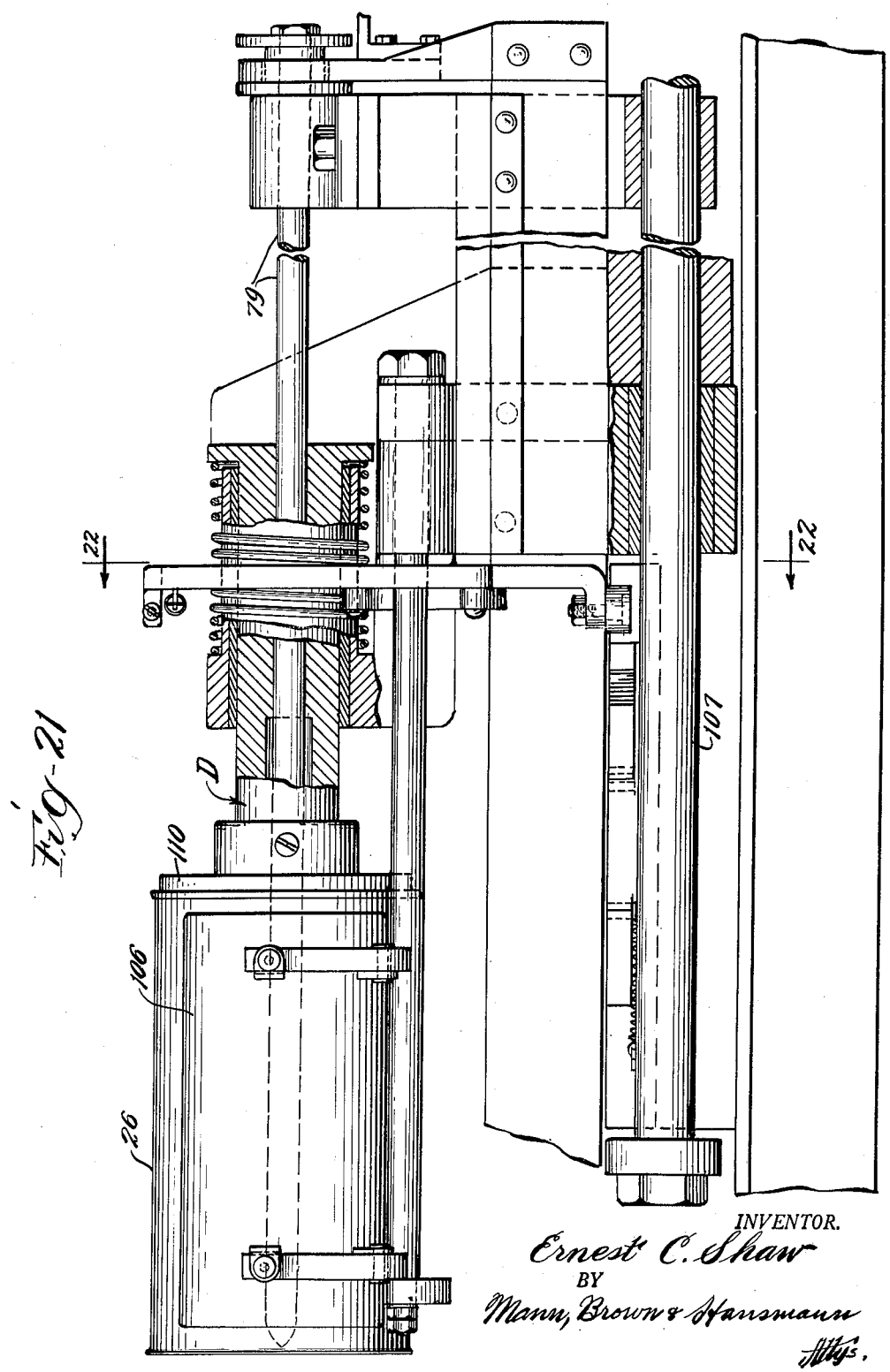

United States Patent Office 2,731,183
Patented Jan. 17, 1956

2,731,183

MAKING OIL FILTER CARTRIDGES

Ernest C. Shaw, Flossmoor, Ill.

Application March 14, 1952, Serial No. 276,625

16 Claims. (Cl. 226—18)

The principal defect in filters made of waste is their lack of uniform density throughout, which results in "channeling" along paths of relatively low obstruction to flow or lighter density. That means that the filtering is actually done by the channeling passages instead of by the whole filter. This difficulty is the unavoidable result of packing filter casings by hand with bulk waste, which always lacks uniformity.

The principal object of this invention is to provide machine and process for making filters and filter material of practically uniform thickness and density throughout crosswise to the flow of liquid to be filtered.

Generally speaking, this is accomplished by laying a uniform layer or sheet of carded waste and a loosely woven fabric one upon the other, and hooking threads of the waste through the fabric to form loops and knit them together.

The result is a sheet of waste threads having great uniformity throughout that may be rolled, folded, piled or otherwise used to filter liquids.

It can be rolled to the size in units of great uniformity and put in containers by hand or by special processes and machines here disclosed.

The uniform layer of waste is obtained by treating commercial waste (as received from the mills) with a "waste puller" or a carding machine which delivers a sheet made up of threads that have been pulled, straightened, and laid generally lengthwise to the sheet. The curl of the threads tends to come back and does partially return, particularly near the top of the sheet, while near the bottom the threads approach straight parallelism. That arrangement makes a good filter structure or bed.

Hooking threads of such a sheet through the fabric to form loops interlaced knits the waste to the fabric and retains the substantial uniformity of threads per unit of cross section to make the passage of liquid, and hence the filtering, substantially the same throughout.

When the material is rolled lengthwise to form a filter cartridge, it is practically uniform throughout with most of the threads running in a general circumferential direction with respect to the filter cartridge. That gives faster, uniform flow and longer life with less material than customary because of the even distribution. The uniformity appears when such a filter cartridge is unrolled after a normal period of use and shows a uniform color throughout.

When waste is compacted under pressure, it becomes impenetrable to needles. Inserting a hooked needle through waste causes movement of threads. On this account, making the laminated sheet of waste and woven fabric uniform is best done by a new process with a new machine which promotes the hooking and knitting of the waste and fabric together, with the result that the uniform layer of waste is preserved during handling and filter forming and packing.

In the drawings:

Fig. 1 is a diagram illustrating the essentials of a machine and steps of the process for making the basic material including a layer of waste and a sheet of fabric;

Fig. 2 is a diagram of part of a machine for making a roll of the basic material and severing it from a continuous strip;

Fig. 3 is a diagram of a complete machine for making a roll of the basic material, cutting it off, and inserting it into a container such as a metal can;

Fig. 4 is a diagram of a winding spindle and a holder or clamp for making the end of the basic material fast to the spindle;

Fig. 5 is a similar diagram illustrating the start of a winding or rolling operation;

Fig. 6 is a similar diagram illustrating a complete roll of the basic material on the spindle and cut off from the supply strip;

Fig. 7 is a similar diagram illustrating the roll of Fig. 6 telescoped with a container such as a can and ready to have the head put on;

Fig. 8 is an enlarged sectional view showing the container and the roll telescoped together in the position the parts of the machine assume as that operation is completed;

Fig. 9 is a section similar to Fig. 8 showing the winding spindle in the process of being removed;

Fig. 10 is a diagram of portions of Fig. 3 showing positions the parts assume as the roll is telescoped with the container;

Fig. 11 is a view similar to Fig. 10 showing the positions of the parts as the spindle is withdrawn;

Fig. 12 is a view corresponding to Fig. 2 but showing more of the machinery with the parts in the position they assume at the start of a winding or roll forming operation;

Fig. 13 is a similar view of some of the parts in Fig. 12 showing the positions they assume after the winding operation has made about one revolution;

Fig. 14 is a view similar to Figs. 12 and 13 showing positions of parts as the roll is nearing completion or the condition shown in Fig. 2, in which the limit or sizing pieces have operated limit switches to stop the spindle, raise the sheet control devices, and lower the knife into position to sever the newly formed roll from the supply strip;

Fig. 15 is a wiring diagram of the machine;

Fig. 16 is a longitudinal sectional view through a portion of the machine showing the relation of the winding spindle, the winding head, and the clamp or holder for the basic material;

Figs. 17, 18, 19, and 20 are cross-sections on the lines 17—17, 18—18, 19—19, and 20—20 of Fig. 16;

Fig. 21 is a longitudinal, sectional view through a portion of the can handler;

Fig. 22 is a section on the line 22—22 of Fig. 21; and

Fig. 23 is a diagram of a switching device forming part of the can handling apparatus.

But these diagrammatic drawings and the corresponding description are used for the purpose of disclosure only.

General description

In Fig. 1, 10 indicates a roll of loosely woven fabric, such as cheesecloth, adapted to be drawn over a guide 11, across a hooking plate 12, and about guide rolls 13 and 14 from which it is delivered to a looping device, a winder, a trimmer, or some other such machine.

15 indicates a carding machine or waste puller which delivers a sheet or layer of carded waste 16 by the action of a doffer roll 17 and a guide roll 18. The delivery is onto a conveyor belt 19 running over the doffer roll 17 and a small idler 20, which conveyor lays the sheet of waste 16 on the cheesecloth 10 and the two travel over the guide 11 and across the hooking plate 12. As they move along the hooking plate, hooked needles 21 pass upwardly and downwardly through the super-imposed layers of waste and fabric in order to hook threads of the waste downwardly through the fabric and knit the two together.

During this operation, the waste is controlled by a controller 22, consisting of spaced bars 23 and 24 straddling the rows of needles 21, both of them lying crosswise to the path of movement of the material to be knitted together.

The machine and process are more fully disclosed in my application Ser. No. 210,346, Feb. 10, 1951, which is included herein by reference, and this application is a continuation in part of that application.

This basic laminated sheet, which for want of a better name is sometimes called a "quilt," or "sheet," or "supply strip," may be rolled, folded, or otherwise shaped by hand or machine for use in filtering.

In Figs. 2 and 3, the basic sheet 16 is being fed into the preferred form of apparatus for winding into rolls 25, severing the rolls and telescoping them with containers 26.

In the course of these operations, the leading edge of the sheet 16 is inserted between a rotatable spindle 27 (Figs. 4, 16, 12, 13, and 14) and the holder or clamp 28, which is then moved to grip or fasten the sheet to the spindle.

The spindle is then set in rotation to wind the sheet 16 into a roll 25, during which the parts pass through the positions indicated in Figs. 12, 13, 14 and 2 in that order, arriving at the stage of operation indicated in Fig. 2, in which the roll 25 is completed and is severed or is being severed from the supply strip 16 by a rotary knife 29.

Initially, of course, the leading edge of the supply strip will be inserted between the spindle 27 and the clamp 28 by hand, and then the machine started. After an operation completed at the position of the parts shown in Fig. 2, the leading edge of the supply strip will be led and inserted into position between the spindle and the clamp by a quilt control, generally indicated by A, which rocks about a shaft 30 between the positions shown in Figs. 12, 13, 14 and 2 in timed relation to a cutter unit generally indicated by B, which rocks about a shaft 31 parallel to the shaft 30 under control of a cam 32 (Fig. 12) and a link and lever mechanism arranged to insure that the quilt control comes into place at the beginning of a roll forming operation, inserts the leading edge of the sheet in position to be clamped to the spindle, gets out of the way for the winding operation, and is sufficiently far removed to clear the knife 29 as the cutter unit B swings into place to cut off the roll.

Curved plates 32 and 33 are arranged about the spindle 27 and serve as formers as well as limiting devices for stopping the roll forming operation when the size has reached the proper limit. In a general way, this is accomplished by mounting those plates on levers 34, pivoted at 35, and cooperating with snap switches 36, which serve to stop the rotation of the spindle and swing the cutter unit into position to sever the newly formed roll from the supply strip.

The cutter unit B, in addition to swinging about the shaft 31 (from the position shown in Fig. 12 to that shown in Fig. 2) travels back and forth along that shaft on a belt conveyor, generally indicated by C, which propels it in each direction by friction.

As the knife reaches the end of its cut on the supply strip, the cutter unit closes a control switch, energizing a solenoid to set a cam shaft in motion for a single revolution. Cams on that shaft operate pneumatic or hydraulic devices by which a can handler, generally indicated by D, brings a can into alignment with and adjacent to the newly formed roll. The spindle and the winding head E associated with it then move lengthwise and rotate to spin the newly formed roll into the container, during which the parts reach the position shown in Fig. 8. Immediately after that, the clamp 28 is released and the spindle 27 withdrawn, an operation partially completed in Fig. 9, and when completed the assembly of container and enclosed roll shown in Fig. 7 drops out of the machine.

The wiring diagram (Fig. 15) gives a quick summary of the apparatus and the sequence of operations.

The quilt control

The quilt control has a generally rectangular frame with side pieces 37 connected by a cross piece 38 and other suitable frame members. It is an open-work frame through which the sheet 16 passes freely at all times subject to other members of the quilt control.

Between the side members 37 of the quilt control frame are levers 40, also mounted to rock on the shaft 30 and normally urged in one direction by springs 41. The right end of the levers 40 in Figs. 2, 12, 13, and 14 carry a pusher plate 42 pivoted to them at 43 and to a lever 44 fulcrumed at 45 and connected by a link 46 with a guide lever 47 fulcrumed at 48 and carrying a guide plate 49, which is normally urged in counter-clockwise direction by a spring 50.

A spring pressed plate 51 cooperates with the guide plate 49 between which the sheet 16 passes.

When a new roll is to be made, the quilt control is swung clockwise about the shaft 30 from the position shown in Fig. 2. That brings the sheet 16 and the guide plates 49 and 51 downwardly toward the position shown in Fig. 12, during which the plate 49 precedes the plate 51 to make a pathway for the leading edge of the sheet between the spindle 27 and the clamp 28. The pusher plate 42 moves in at the appropriate time to give the leading edge the push necessary to insert it between the spindle and the clamp if it does not go there. The relation is about as shown in Fig. 12.

At this point in the operation, the levers 40 are given a quick movement by a cam lever 52 and a link 53 with a result that there is a quick snap of the parts from the position shown in Fig. 12 toward the position shown in Fig. 13, taking the guide plates and pusher plates out of the way.

In proper timed relation, the clamp bar 28 is snapped against the spindle 27 by mechanism shown in detail in Figs. 16–19, and operated by a clamp cylinder 54 (Fig. 3).

The spindle 27 is set in motion and the winding proceeds as indicated, from Fig. 13 through Fig. 14, to the limit position in Fig. 2, when the accurate measurement of the roll by the curved plates 32 and 33 stops the winding, brings down the cutter, etc., as above mentioned.

On the shaft 30, about which the quilt control rocks, there is a rocking lever 55, the right arm of which has pins 56 (Figs. 2, 12, 13, and 14) extending beneath the side members 37 of the quilt control frame for lifting it and supporting it at appropriate times. The left arm of the lever 55 is connected by a link 57 with a bell crank lever 58, which, in turn, is connected by a link 59 with a bell crank lever 60, and that, in turn, is connected by a link 61 with an arm 62 on the cutter unit B. This arrangement of links and levers ties the quilt control A and the cutter unit B together, and forces a certain sequence of operation, subject to slight modification.

A stout spring 63 connected to the bell crank lever 60 tends to hold the parts in the position shown in Fig. 12.

The bell crank lever 58 is equipped with a dog 64 to cooperate with a pivoted and spring pressed latch 65, by which the parts are held in a fixed relation indicated in dotted lines in Fig. 14 until released.

Parallel to the axis of the spindle, about which the main operations are performed, is a cam shaft 66 which takes control of the operations immediately after the cut off of a roll.

The snap switches 36 are double-pole, double-throw switches controlling the D. C. line shown at the bottom of Fig. 15 and the A. C. line shown at the top thereof.

When the size limit of the roll operates those switches as indicated in Fig. 2, a magnetic clutch 67 driving the spindle and winding head is de-energized and a brake 68 is applied, stopping the winding quickly.

Simultaneously, the solenoid 69 (Fig. 12) shifts a roller 70 on the bell crank lever 60 into the path of the cam 32, which is rotated continuously from the motor M. The clockwise movement of the cam 32 rocks the bell crank lever 60 counter-clockwise against the resistance of the spring 63 and through the connected linkage and levers raises the quilt control A and lowers the cutter unit B, during which the parts take the position shown in Fig. 2 for the cut-off. As the cutter unit B reaches the horizontal position shown in Fig. 2, it opens the circuit of the solenoid 69 and permits the roller 70 to retract out of the path of the cam 32.

*The cutter unit conveyor*

The cutter unit conveyor includes V belts 72 running in a circuit crosswise to the path of the sheet 16 and parallel to the shaft 31 on which the cutter unit B rocks and travels.

As the cutter comes down to the position shown in Fig. 2, friction elements, the details of which are omitted for clarity, establish sufficient friction between the cutter unit and the V belts of the conveyor C to propel the cutter unit along the shaft 31 and take the knife 29 through the sheet. Any unusual resistance to the knife will be taken care of by slippage in the friction drive.

This permits the cutter to take the time necessary to make the cut-off stroke without disturbing the material of the sheet 16. The next operation of the machine simply awaits the completion of the cutting stroke.

*The single revolution operation for spinning the roll into the container*

When the cutter unit reaches the end of its travel to the right in Fig. 3, it strikes a switch 73, energizes a solenoid 74 (Figs. 3 and 15), and closes a single revolution clutch 75 on the cam shaft 66. A single revolution of that shaft follows, and through a series of cams, switches, and valves the brake 68 is released and the clutch 67 engaged, starting the spindle and with it the associated winding head. Air is supplied to the head cylinder 76; and the spindle, the roll on it, and the winding head E are given axial movement to the right.

Anticipating that, another cam on the shaft 66 has energized the cam shifting cylinder 77, and the can mechanism has moved a can from the position shown in Fig. 3 to that shown in Fig. 10. The result is that the roll 25 is rotated and pressed at the same time to telescope with the can. The spinning, injecting operation obviates jamming and insures correct assembly.

In some containers 26, there is a tube 78, and a centering rod 79 of the can handler takes the position shown in Fig. 8, centering the container 26 and the tube 28 with the coil 26 and the spindle 27. In such a case, the centering pin 79 is withdrawn before or simultaneously with the withdrawal of the winding spindle, substantially as indicated in Fig. 9.

As soon as the assembly of the roll in the container has been completed, the cam shaft shifts the air to the spindle return cylinder 80 and withdraws the spindle, leaving the winding head in position to prevent movement of the coil and immediately thereafter energizes the head cylinder 76 to withdraw the winding head.

Spreading of the plates 32 and 33 is resisted by springs 116, and as the roll builds up the tension on the turns increases, which with the forming action of the plates compacts the roll to suitable density and prepares it for insertion into the container, during which the rotation is continued.

The whole operation fills the can with a resilient mass of very uniform density, which, of course, can be varied to suit the filtering to be done. When the can is closed, it is entirely filled with the surface of the filter in close contact with the walls of the can.

The winding head, generally indicated by E, as shown in Fig. 16 is journalled in a cross head 81 sliding on supporting rods 82. The spindle 27 is a tube extending from the winding head, as shown in Fig. 16, and moves with the winding head to the right to insert the roll into the container, but moves separately from the winding head to be withdrawn in advance of the winding head. This is accomplished by making the spindle slidable in the head and attaching it to a rod 83 arranged axially with respect to the spindle and head and connected with the spindle return cylinder 80.

The cross head 81 is connected by a hooked rod 89, engaged with a forked hook 90 on another cross head 91, which serves to connect the spindle and the winding head together for translation to the right, but leaves them free for the spindle to be withdrawn in advance of the winding head in movement to the left.

*Counter shaft control cam mechanism*

Parallel to and above the cam shaft 66 is shown in Figs. 2, 12, 13 and 14 a counter shaft 92 driven in unison with the cam shaft 66 by belt drive 93. On the counter shaft 92 is a cam 94 bearing a pin 95 for shifting the latch bar 65 to release the dog 64 and permit the spring 63 to move the quilt control A and the cutter unit B from the position shown in Fig. 2 to that shown in Fig. 12.

This follows in natural sequence during the single revolution operation carried on by the cam shaft 66 and prepares the machine for the next roll making operation.

The cam 94 also cooperates with the roller 96 on the quilt control frame to adjust the position of that frame during the operation of the machine.

As the cutter unit B assumes a position shown in Fig. 12, friction devices generally indicated by F engage the return run of the conveyor belts 72 and the cutter unit is propelled along the rod 31 back to its original position.

*Operative movement of the clamp 28*

As shown in Figs. 16, the clamp 28 is secured to the rod 83 (which bears the spindle 27) by a link 97 and a bell crank lever 98, the latter being connected by link 99 with an arm 100 on a tube 101 slidable on the rod 83. The tube 101 is connected with the cam cylinder 54 shown at the left in Fig. 3 by which the tube 101 is moved to open or close the clamp 28 as the operation requires.

The clamp cylinder 54 (Fig. 3) is mounted on an extension 102 of the cross head 91 connected with the piston and the spindle return cylinder 80. By that arrangement, when the spindle is moved to the right to fill a can, the clamp moves to the right simultaneously; but before the spindle is withdrawn release of the pressure in the clamp cylinder 54 releases the clamp to ease the withdrawal of the spindle.

*Can handling unit*

The can handling unit includes a gravity conveyor 104 leading to a rocker 105 operated at the end of the previous can filtering operation to drop the can holder 106, which is mounted to move along the rods 107 to and from the charging position shown, respectively, in Figs. 3 and 10. It is also associated with the rod 79 shown in Figs. 8 and 9, telescoped with the tube in the can or container. The can holder and the rod 79 are moved back and forth by the cylinder 77, the rod 108, and the cross head 109.

Movement to the left is initiated by a cam on the cam shaft 66, which inserts the rod 79 into the tube 78 and brings the head 110 against the end of the container. Further movement to the left in Fig. 3 toward the position shown in Fig. 10 brings the container into position to receive the roll 25 as the spindle and winding head take the position shown in Figs. 8 and 11.

Also in timed relation, the rod 79 is withdrawn as shown in Fig. 9, after which the can holder is returned to the position shown in Fig. 3, lost motion between the cross head 109 and the can holder 106 taking care of the delay in movement of the latter.

As shown in Fig. 22 the can holder 106 includes pivoted arms controlled by a lever 112 running against a track 113. The track 113 includes gates 114, one of which is shown in Fig. 23, which cooperate with the lever 112 to engage and release the can holder at the proper time.

According to the operation of the machine and the process here disclosed, the size of the roll 25 automatically determines the volume and weight of the filter material to be used in the filter cartridge 26. It has been found that that weight is so uniformly measured that the difference between successive windings will not tip a postal scale.

This, taken with the formation of the uniform layer of waste knitted to the carrier represented by the woven fabric, makes it possible to produce filter cartridges uniform throughout and uniform in successive cartridges. It also makes it possible to produce filter cartridges seven times faster than they can be reproduced by the best organized hand crew.

It has been found that by using half the waste material ordinarily used in hand packed waste filters, greater filtering capacity is afforded by this invention and longer life can be had. In instances, the increase is as much as 100%. This is partly due to the fact that the waste is uniformly distributed in the sheet and is maintained uniformly distributed by being woven to the fabric.

When a sheet is rolled to form a filter cartridge, it can be made denser at the outside by increasing the tension as the roll builds up, or denser toward the interior by reverse variation of tension. If oil is to pass through the roll from the outer side, it is often best to have the tension decrease as the roll enlarges so that the outer portion will be more pervious than the inner, and the solid material and the oil can penetrate a short distance, depending upon its size and increase the filtering ability of the material by building up the bed of extraneous solids to be removed from the oil.

When rolled by the machine as disclosed in this application, the final tightening before or simultaneously with inserting the roll into the can can be released slightly by making the size of the tube 78 suitably smaller than the spindle 27 to the end that, when the spindle is withdrawn as shown in Fig. 9, the inner turns have the tension relaxed accordingly.

This is especially appropriate for a filter in which the flow is from the tube 78 outwardly.

It is also an important feature of the filter cartridge made of the basic material of this invention that the warp threads continually bind it circumferentially while the woof threads restrain its elongation lengthwise to the cartridge. Hence, the threads of the woven material strongly tend to maintain the size and form of the roll cartridge with appropriate resilience. To some extent, that is true of the folded or piled pads or packages of the basic material.

In a roll such as shown in Figs. 6 and 7, the spiral turns of the woven fabric hold the waste in place throughout.

In the preferred form of the invention, the woven material is what is known as cheesecloth, and the unwoven material is what is known as carded waste, for which the Association of American Railroads, Mechanical Division, Specifications, M-905-41, adopted 1928, revised 1934, 1941, for New Waste for Journal Box Packing, will be found satisfactory, except that no slasher should be used for filtering oil.

However, for filtering lubricating oil, cotton waste alone will be preferred by many because it inhibits the passage of moisture and absorbs acids. In filtering fuel oil, wool waste will be preferred by many because it passes the moisture.

In disclosing a machine of this application, framework and mechanical features have been omitted in the interest of clearness; and, since the switches, valves, and such like are chosen from well known commercial sources, description and showing of detail have been omitted in the interest of conciseness.

The snap switches 36 having been found most satisfactory are what are known in the trade as Micro Switches made by Micro Switch Corporation, Freeport, Illinois (on the order of that disclosed in Eaton No. 2,170,748, Aug. 22, 1939).

I claim:

1. In a machine for making filter cartridges, a rotatable winding spindle, a clamp movable toward the spindle to hold against the spindle one end of a strip of sheet material to be wound, means to rotate the spindle, movable forming and limit means to yieldingly press material wound on the spindle during rotation, a movable cutter for the material, control means operable by the forming and limit means and responsive to the winding of a predetermined thickness of material on the spindle to stop the spindle and move the cutter into cutting engagement with an unwound portion of the strip, means to telescope the wound material into a container, and means to withdraw the spindle from the wound material.

2. In a machine for making filter cartridges, a rotatable winding spindle, a clamp movable toward the spindle to hold against the spindle one end of a strip of sheet material to be wound, means to rotate the spindle, movable forming and limit means to yieldingly press material wound on the spindle during rotation, a movable cutter for the material, control means operable by the forming and limit means and responsive to the winding of a predetermined thickness of material on the spindle to stop the spindle and move the cutter into cutting engagement with an unwound portion of the strip, means to bring a container adjacent to and in alignment with the spindle, means to telescope the wound material into the container, and means to withdraw the spindle from the wound material.

3. In a machine for making filter cartridges, a rotatable winding spindle, a clamp movable toward the spindle to hold against the spindle one end of a strip of sheet material to be wound against the spindle, means to rotate the spindle, movable forming and limit means to yieldingly press material wound on the spindle during rotation, a movable cutter for the material, control means operable by the forming and limit means and responsive to the winding of a predetermined thickness of material on the spindle to stop the spindle and move the cutter into cutting engagement with an unwound portion of the strip, means to bring a container adjacent to and in alignment with the spindle, means to telescope the wound material into the container, means to withdraw the clamp from the spindle, and means to withdraw the spindle from the wound material.

4. In a machine for making filter cartridges, a rotatable winding spindle, a clamp movable toward the spindle to hold against the spindle one end of a strip of sheet material to be wound against the spindle, means to rotate the spindle, movable forming and limit means to yieldingly press material wound on the spindle during rotation, a movable cutter for the material, control means operable by the forming and limit means and responsive to the winding of a predetermined thickness of material on the spindle to stop the spindle and move the cutter into cutting engagement with an unwound portion of the strip, means to bring a container adjacent to and in alignment with the spindle, means including a winding and inserting head to telescope the wound material into the container, and means to withdraw the spindle from the wound material.

5. In a machine for making filter cartridges, a rotatable winding spindle, means to feed a strip of sheet material to the spindle and hold one end thereon, means to rotate the spindle, movable forming and limit means to yieldingly press material wound on the spindle during rotation, a movable cutter for the material, control means operable by the forming and limit means and responsive to the winding of a predetermined thickness of material on the spindle to stop the spindle and move the cutter into cutting engagement with an unwound portion of the strip, means to telescope the wound material into a container, and means to withdraw the spindle from the wound material.

6. In a machine for making filter cartridges, a rotatable spindle adapted to have a sheet of material wound on it, a winding and inserting head rotatable with the spindle, movable forming and sizing means disposed adjacent to the spindle for engagement by material wound on the spindle, a cutter adjacent to the spindle, control means operable by the forming and sizing means for operating the cutter to cut the sheet behind the wound portion thereof, and means to shift the spindle and the head axially together and independently.

7. In a machine for making filter cartridges, a rotatable spindle adapted to have a sheet of material wound on it, a winding and inserting head rotatable with the spindle, movable forming and sizing means disposed adjacent to the spindle for engagement by material wound on the spindle, a cutter adjacent to the spindle, control means operable by the forming and sizing means for operating the cutter to cut the sheet behind the wound portion thereof, and means to simultaneously shift the spindle and the head axially and rotate them.

8. In a machine for making filter cartridges, a rotatable winding spindle, means to hold against the spindle one end of a strip of sheet material to be wound, means to rotate the spindle, movable forming and limit means to yieldingly press material wound on the spindle during rotation, a movable cutter for the material, control means operable by the forming and limit means and responsive to the winding of a predetermined thickness of material on the spindle to stop the spindle and move the cutter into cutting engagement with an unwound portion of the strip, means to telescope the wound material into a container, means to withdraw the spindle from the wound material, and control means for the last two means mentioned operable by the cutter.

9. In a machine for making filter cartridges, a rotatable winding spindle, means to hold against the spindle one end of a strip of sheet material to be wound, means to rotate the spindle, movable forming and limit means to yieldingly press material wound on the spindle during rotation, a movable cutter for the material, control means operable by the forming and limit means and responsive to the winding of a predetermined thickness of material on the spindle to stop the spindle and move the cutter into cutting engagement with an unwound portion of the strip, means to telescope the wound material into a container, means to withdraw the spindle from the wound material, and control means for the last two means mentioned operable by the cutter and including a single revolution clutch.

10. The process of making filter cartridges which includes laying a relatively thick uniform layer of waste and a woven fabric one upon the other and pulling threads of the waste through the fabric to fasten them together, winding the sheet thus formed on a spindle, cutting the wound portion from the remainder of the sheet, telescoping the wound portion into a container, and withdrawing the spindle from the wound portion.

11. The process of making filter cartridges which includes laying a relatively thick uniform layer of waste and a woven fabric one upon the other and pulling threads of the waste through the fabric to fasten them together, winding the sheet thus formed on a spindle, cutting the wound portion from the remainder of the sheet, telescoping the wound portion into a container with simultaneous rotating and translating relative movement, and withdrawing the spindle from the wound portion.

12. The process of making filter cartridges which includes knitting a uniform layer of waste to a loosely woven fabric, winding the composite sheet thus formed on a spindle, cutting the wound portion from the remainder of the sheet, telescoping the roll thus formed into a container, and withdrawing the spindle.

13. The process of making filter cartridges which includes attaching the end of a laminated sheet of indefinite length to a spindle, rotating the spindle to form a laminated roll of predetermined diameter, stopping the rotation, cutting the roll from the remainder of the sheet, telescoping the roll into a container, and withdrawing the spindle.

14. The process of making filter cartridges which includes attaching the end of a laminated sheet of indefinite length to a spindle, rotating the spindle to form a laminated roll of predetermined diameter, stopping the rotation, cutting the roll from the remainder of the sheet, telescoping the roll within a container by simultaneous relative rotation and translation, and withdrawing the spindle.

15. In a machine for making filter cartridges, a rotatable winding spindle, means to hold against the spindle one end of a strip of sheet material to be wound, means to rotate the spindle, movable forming and limit means to yieldingly press material wound on the spindle during rotation, a cutter, a conveyor for moving the cutter into cutting engagement with an unwound portion of the sheet, and control means operable by the forming and limit means and responsive to the winding of a predetermined thickness of material on the spindle to stop the spindle and start the conveyor.

16. In a machine for making filter cartridges, a rotatable winding spindle, means to hold against the spindle one end of a strip of sheet material to be wound, means to rotate the spindle, movable forming and limit means to yieldingly press material wound on the spindle during rotation, a cutter, a conveyor frictionally engageable with the cutter for moving the cutter into cutting engagement with an unwound portion of the sheet, and control means operable by the forming and limit means and responsive to the winding of a predetermined thickness of material on the spindle to stop the spindle and start the conveyor.

References Cited in the file of this patent

UNITED STATES PATENTS

| Number | Name | Date |
|---|---|---|
| 1,314,565 | Billington | Sept. 2, 1919 |
| 1,454,049 | Genung | May 8, 1923 |
| 1,529,701 | Hewitt | Mar. 17, 1925 |
| 1,690,954 | Bettison | Nov. 6, 1928 |
| 1,771,869 | Baldenhofer | July 29, 1930 |
| 2,086,375 | Baier et al. | July 6, 1937 |
| 2,141,903 | Brundage | Dec. 27, 1938 |
| 2,311,736 | Cleminson | Feb. 23, 1943 |
| 2,361,783 | McLaughlin | Oct. 31, 1944 |
| 2,381,184 | Ripley | Aug. 7, 1945 |
| 2,421,704 | Kasten | June 3, 1947 |
| 2,537,898 | Hunter et al. | Jan. 9, 1951 |